United States Patent
Kato (10) Patent No.: US 9,723,668 B2
(45) Date of Patent: Aug. 1, 2017

(54) SWITCHING CONVERTER AND LIGHTING DEVICE USING THE SAME

(71) Applicant: ROHM CO., LTD., Ukyo-ku, Kyoto (JP)

(72) Inventor: Ryo Kato, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 15/172,776

(22) Filed: Jun. 3, 2016

(65) Prior Publication Data

US 2016/0360583 A1 Dec. 8, 2016

(30) Foreign Application Priority Data

Jun. 5, 2015 (JP) ................. 2015-114677

(51) Int. Cl.
- *H05B 41/28* (2006.01)
- *H05B 33/08* (2006.01)
- *H02M 1/32* (2007.01)
- *H02M 3/156* (2006.01)

(52) U.S. Cl.
CPC .......... *H05B 33/0815* (2013.01); *H02M 1/32* (2013.01); *H02M 3/156* (2013.01); *H05B 33/0803* (2013.01)

(58) Field of Classification Search
CPC ............ H05B 33/0815; H05B 33/0845; H05B 33/0851; H05B 33/0809; H05B 33/0812; H05B 33/0884; H05B 33/0866

USPC .............. 315/247, 224, 185 S, 291, 307–326
See application file for complete search history.

(56) References Cited

U.S. PATENT DOCUMENTS

| 2014/0268918 A1* | 9/2014 | Gong ................... H02M 7/217 363/21.15 |
| 2016/0007417 A1* | 1/2016 | Gao ................... H05B 33/0815 315/219 |

FOREIGN PATENT DOCUMENTS

| JP | 2003153529 A | 5/2003 |
| JP | 2004047538 A | 2/2004 |

* cited by examiner

*Primary Examiner* — Tuyet Vo
(74) *Attorney, Agent, or Firm* — Cantor Colburn LLP (57) ABSTRACT

A switching converter for supplying power to a load, includes: an output circuit including at least a switching transistor, an inductive element, and a rectifying element configured to rectify a current flowing to the inductive element according to switching of the switching transistor; a control circuit configured to drive the switching transistor; a first capacitor configured to generate a power source voltage for the control circuit between both ends of the first capacitor; a start-up circuit installed between an input line to the switching converter and the first capacitor and configured to charge the first capacitor with an input voltage of the input line; and a discharge circuit configured to discharge the first capacitor when the switching converter is started up.

16 Claims, 8 Drawing Sheets

SWITCHING CONVERTER AND LIGHTING DEVICE USING THE SAME

CROSS-REFERENCE TO RELATED APPLICATION

This application is based upon and claims the benefit of priority from Japanese Patent Application No. 2015-114677, filed on Jun. 5, 2015, the entire contents of which are incorporated herein by reference.

TECHNICAL FIELD

The present disclosure relates to a switching converter.

BACKGROUND

Figure 1:
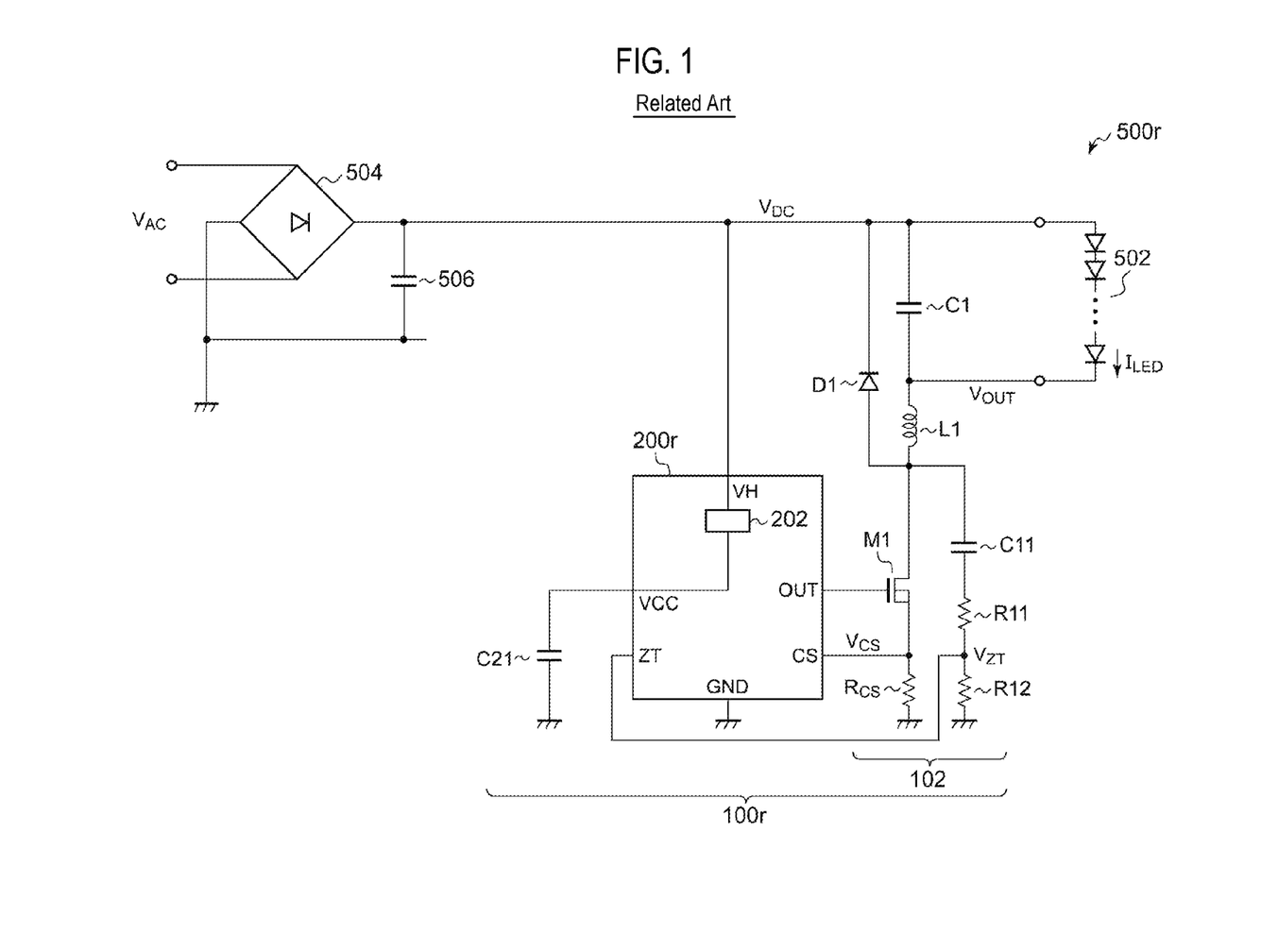
FIG. 1 is a block diagram of a lighting device including an LED.

Semiconductor light sources such as light emitting diodes (LEDs) as a liquid crystal backlight or lighting equipment have become prevalent. FIG. 1 is a block diagram of a lighting device including an LED. A lighting device 500r includes an LED light source 502, a rectifying circuit 504, a smoothing condenser 506, and a switching converter 100r. The LED light source 502 is an LED string, and includes a plurality of LEDs connected in series. The rectifying circuit 504 and the smoothing condenser 506 rectify and smooth a commercial alternating current (AC) voltage $V_{AC}$ to convert it into a DC voltage $V_{DC}$. The switching converter 100r receives the DC voltage $V_{DC}$ as an input voltage $V_{IN}$ and supplies a driving current $I_{LED}$ corresponding to a desired amount of light to the LED light source 502.

The switching converter 100r is a step-down converter, and includes an output circuit 102 and a control circuit 200r. The output circuit 102 includes a smoothing capacitor C1, a rectifying diode D1, a switching transistor M1, an inductor L1, a detection resistor $R_{CS}$, a capacitor C11, and resistors R11 and R12.

During an ON period of the switching transistor M1, a coil current $I_{L1}$ flows to the detection resistor $R_{CS}$ by way of the inductor L1 and the switching transistor M1. A voltage drop (current detection signal) $V_{CS}$ of the detection resistor $R_{CS}$ is fed back to a current detection (CS) terminal of the control circuit 200r. The control circuit 200r generates a pulse signal whose duty ratio is adjusted such that a peak of the current detection signal $V_{CS}$ becomes close to a target voltage corresponding to a target amount of light of the LED light source 502, and switches the switching transistor M1 connected to an OUT terminal. A driving current $I_{LED}$ smoothed from the coil current $I_{L1}$ is supplied to the LED light source 502.

A voltage $V_{ZT}$ that is based on a drain voltage $V_D$ of the switching transistor M1 is input to a zero cross detection (ZT) terminal of the control circuit 200r through the capacitor C11 and the resistors R11 and R12. The control circuit 200r detects that the coil current $I_L$ flowing through the inductor L1 becomes zero (zero cross) according to the voltage $V_{ZT}$, and turns on the switching transistor M1. Further, the control circuit 200r detects that the current detection signal $V_{CS}$ reaches a target voltage $V_{REF}$, and turns off the switching transistor M1.

A DC voltage $V_{DC}$ is input to a high voltage (VH) terminal of the control circuit 200r, and a capacitor C21 is connected to a power source (VCC) terminal. The control circuit 200r includes a start-up circuit 202 installed between the VH terminal and the VCC terminal. Since the DC voltage $V_{DC}$ is a high voltage of 100V or higher, the start-up circuit 202 is configured by using a high withstand voltage device.

When a user of the lighting device 500r turns on a switch for lighting on and off the lighting device 500r, the AC voltage $V_{AC}$ is supplied to the rectifying circuit 504 and the voltage $V_{DC}$ of the smoothing condenser 506 is increased. In response to turning on the switch, the control circuit 200r is started up. When the control circuit is started up, a start-up current flows from the VH terminal to the capacitor C21 by way of the start-up circuit 202 and the VCC terminal so that the capacitor C21 is charged.

A voltage $V_{CC}$ of the capacitor C21 is a power source voltage of the control circuit 200r. The control circuit 200r is operable when the power source voltage $V_{CC}$ exceeds a predetermined threshold voltage (lowest operating voltage) $V_{UVLO}$, and starts to switch the switching transistor M1. Thus, the LED light source 502 is lighted.

The present inventors reviewed the switching converter 100r of FIG. 1 and recognized the following technical problem.

A user may want to set up a time (start-up time) for the LED light source 502 to actually be lighted at a desirable time after the user turns on the power. In a related-art, a fluorescent lamp or an incandescent lamp is lighted through a start-up time which is relatively long until it is lighted after a switch is turned on, but a start-up time of a semiconductor light source such as the LED light source 502 is shorter than that of the fluorescent lamp or the incandescent lamp, and the use of the LED light source 502 in combination with the fluorescent lamp or the incandescent lamp causes disharmony. Further, even when the LED light source 502 is used alone, it may be desirable that the start-up time of the LED light source 502 is relatively long.

Here, in order to clarify the technical problem, the lighting device 500r having the LED light source 502 has been described as an example, but a start-up time taken from a time at which power is applied to a time at which a load is operated may be set, even for the switching converter 100r for supplying power to a certain load in applications other than the lighting device 500r.

SUMMARY

The present disclosure provides some embodiments of a switching converter in which a start-up time may be set.

According to one embodiment of the present disclosure, there is provided a switching converter for supplying power to a load. The switching converter includes: an output circuit including at least a switching transistor, an inductive element, and a rectifying element configured to rectify a current flowing to the inductive element according to switching of the switching transistor; a control circuit configured to drive the switching transistor; a first capacitor configured to generate a power source voltage for the control circuit between both ends of the first capacitor; a start-up circuit installed between an input line to the switching converter and the first capacitor and configured to charge the first capacitor with an input voltage of the input line; and a discharge circuit configured to discharge the first capacitor when the switching converter is started up.

The first capacitor is charged with a difference between a charge current provided by the start-up circuit and a discharge current provided by the discharge circuit. Thus, it is possible to adjust a charge speed by adjusting the discharge current provided by the discharge circuit, and further set a rising time of the power source voltage and a start-up time of the switching converter.

A discharge current flowing through the discharge circuit may be increased after the switching converter is started up, and subsequently decreased over time.

The discharge circuit may include a second capacitor charged according to the input voltage, and the discharge current flowing through the discharge circuit may decrease as a voltage of the second capacitor increases.

The discharge circuit may include: a discharge transistor installed in parallel to the first capacitor; and a bias circuit configured to supply a bias signal that is based on the input voltage to a control terminal of the discharge transistor.

Thus, it is possible to change the discharge current flowing through the discharge transistor according to the input voltage.

In some embodiments, the bias circuit may include: a second capacitor; and a first resistor installed between the input line and the second capacitor. The bias signal that is based on a voltage of the second capacitor may be supplied to the control terminal of the discharge transistor.

Since a voltage of the control terminal of the discharge transistor is increased according to a CR time constant, it is possible to adjust the start-up time based on capacitance of the second capacitor and a resistance value of the first resistor.

In some embodiments, the bias circuit may further include a second resistor installed in parallel to the second capacitor.

In some embodiments, the bias circuit may further include a Zener diode installed in series to the first resistor between the second capacitor and the input line.

In some embodiments, the discharge transistor may be a PNP-type bipolar transistor or a P-channel MOSFET.

In some embodiments, the control circuit may include: a power source terminal to which the first capacitor is connected; and a high voltage terminal configured to receive the input voltage from the input line. The control circuit may include the start-up circuit incorporated between the power source terminal and the high voltage terminal.

In some embodiments, the start-up circuit may include a third resistor installed outside the control circuit between the input line and the first capacitor.

In this case, the start-up circuit having a high withstand voltage device is not required in the control circuit.

In some embodiments, the load may be a semiconductor light source. Thus, it is possible to set a lighting time of the semiconductor light source.

In some embodiments, the output circuit may include: an output capacitor installed between an output line to which one end of the load is connected and the input line; a diode having a cathode connected to the input line; an inductor installed between the output line and an anode of the diode; and the switching transistor installed between the anode of the diode and a ground.

In some embodiments, the output circuit may have a flyback-type topology. In some embodiments, the output circuit may have a topology of a buck converter or a boost converter.

According to another embodiment of the present disclosure, there is provided a lighting device. The lighting device may include: a semiconductor light source; and any one of the switching converters described above, configured to light the semiconductor light source.

In some embodiments, the lighting device may further include: a rectifying circuit configured to rectify an AC voltage; and a smoothing capacitor configured to smooth an output voltage of the rectifying circuit to supply the same to an input line of the switching converter.

Further, any combinations of the foregoing components or replacement of expressions among a method, an apparatus, a system and the like are also effective as embodiments of the present disclosure.

DETAILED DESCRIPTION

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case in which the member A and the member B are indirectly connected through any other member that does not affect an electrical connection state thereof.

Similarly, "a state where a member C is installed between a member A and a member B" also includes a case where the member A and the member C or the member B and the member C are indirectly connected through any other member that does not affect an electrical connection state, in addition to a case in which the member A and the member C or the member B and the member C are directly connected.

Figure 2:
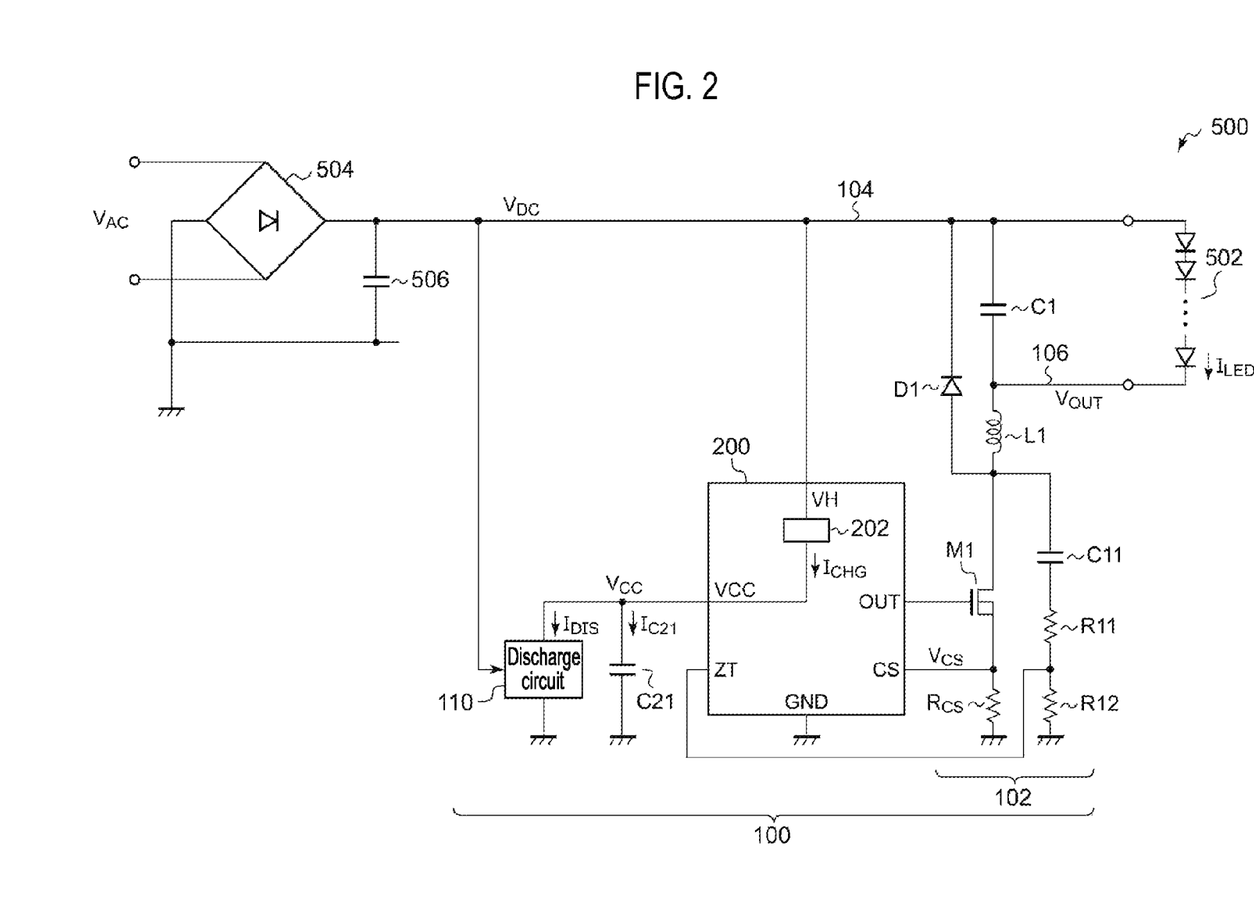
FIG. 2 is a circuit diagram of a lighting device including a switching converter according to an embodiment of the present disclosure.

FIG. 2 is a circuit diagram of a lighting device 500 including a switching converter 100 according to an embodiment of the present disclosure.

The lighting device 500 includes an LED light source 502, a rectifying circuit 504, a smoothing condenser 506, and a switching converter 100. A basic configuration of the lighting device 500 is the same as that described with reference to FIG. 1. A filter may be inserted in a front stage or a rear stage of the smoothing condenser 506.

Upon receipt of a DC input voltage $V_{DC}$ by an input line 104, the switching converter 100 generates an output voltage $V_{OUT}$ by converting the DC input voltage $V_{DC}$ to have an appropriate voltage level, and supplies the output voltage $V_{OUT}$ to a load connected to an output line 106. The load is a semiconductor light source, and for example, the load is the LED light source 502 including a plurality of LEDs connected in series. The switching converter 100 stabilizes a driving current $I_{LED}$ flowing through the LED light source 502 to a target current $I_{REF}$ corresponding to a target luminance of the LED light source 502 through a feedback controlling.

The switching converter 100 includes an output circuit 102, a control circuit 200, a first capacitor C21, and a discharge circuit 110.

The output circuit 102 includes at least a switching transistor M1, an inductor L1 as an inductive element, and a rectifying diode D1 as a rectifying device for rectifying a current flowing through the inductor L1 according to switching of the switching transistor M1. The switching transistor M1 may be incorporated in the control circuit 200.

The topology of the output circuit 102 is not particularly limited, and an appropriate circuit configuration may be employed according to a relationship between the input voltage $V_{DC}$ and the output voltage $V_{OUT}$ and a switching scheme of the switching transistor M1.

The control circuit 200 feedback-controls a time ratio (duty ratio) of a switching ON time and a switching OFF time of the switching transistor M1 such that the driving current $I_{LED}$ becomes close to the target current $I_{REF}$. Since a commercial product may be used as the control circuit 200, a description of an internal configuration thereof will be omitted.

In this embodiment, the switching converter 100 is a buck converter (or a step-down converter), and the output circuit 102 includes the inductor L1, the rectifying diode D1, the switching transistor M1, a detection resistor $R_{CS}$, a smoothing capacitor C1, a capacitor C11, and resistors R11 and R12.

During an ON period of the switching transistor M1, the driving current $I_{LED}$ which passes through the input line 104, the LED light source 502, the inductor L1, and the switching transistor M1 flows to the detection resistor $R_{CS}$. During an OFF period of the switching transistor M1, the driving current $I_{LED}$ flows along a path of the input line 104, the LED light source 502, the inductor L1, and the rectifying diode D1.

In other words, during an ON period of the switching transistor M1, a voltage drop (current detection signal) $V_{CS}$ in proportion to a coil current $I_{L1}$ is generated across the detection resistor $R_{CS}$. The current detection signal $V_{CS}$ is fed back to the current detection (CS) terminal of the control circuit 200. The control circuit 200 generates a pulse signal whose duty ratio is adjusted such that a peak of the current detection signal $V_{CS}$ becomes close to the target voltage $V_{REF}$ corresponding to the target current $I_{REF}$, and switches the switching transistor M1 connected to the OUT terminal.

According to the embodiment, the control circuit 200 switches the switching transistor M1 according to a so-called quasi-resonant (QR) scheme. A detection voltage $V_{ZT}$ that is based on a drain voltage $V_D$ of the switching transistor M1 is input to the zero cross detection (ZT) terminal of the control circuit 200 through the capacitor C11 and the resistors R11 and R12. The detection voltage $V_{ZT}$ has a voltage level corresponding to a coil current $I_L$ of the inductor L1 during an OFF period of the switching transistor M1. The control circuit 200 detects that the coil current $I_L$ flowing through the inductor L1 becomes zero (zero cross) according to the detection voltage $V_{ZT}$, and turns on the switching transistor M1. Further, the control circuit 200 detects that the current detection signal $V_{CS}$ reaches the target voltage $V_{REF}$, and turns off the switching transistor M1.

The first capacitor C21 generates a power source voltage $V_{CC}$ between both ends of the first capacitor C21. The power source voltage $V_{CC}$ is connected to a power source (VCC) terminal of the control circuit 200. The control circuit 200 operates using the power source voltage $V_{CC}$ as a power source.

The DC voltage $V_{DC}$ is input to the high voltage (VH) terminal of the control circuit 200. The control circuit 200 includes a start-up circuit 202 installed between the VH terminal and the VCC terminal. Since the DC voltage $V_{DC}$ has a high voltage of 100V or higher, the start-up circuit 202 is configured by using a high withstand voltage device.

Specifically, the start-up circuit 202 is installed between the input line 104 to the switching converter 100 and the first capacitor C21, receives the input voltage $V_{DC}$ of the input line 104, and supplies a charge current $I_{CHG}$ to the first capacitor C21 to charge the first capacitor C21.

The discharge circuit 110 starts discharging of the first capacitor C21 with a rise of the input voltage $V_{DC}$ of the input line 104 when the switching converter 100 is started up. A discharge current $I_{DIS}$ flowing through the discharge circuit 110 is increased to its peak after the switching converter 100 is started up, and subsequently decreased over time. The discharge circuit 110 may be recognized as a variable current source.

Figure 3:
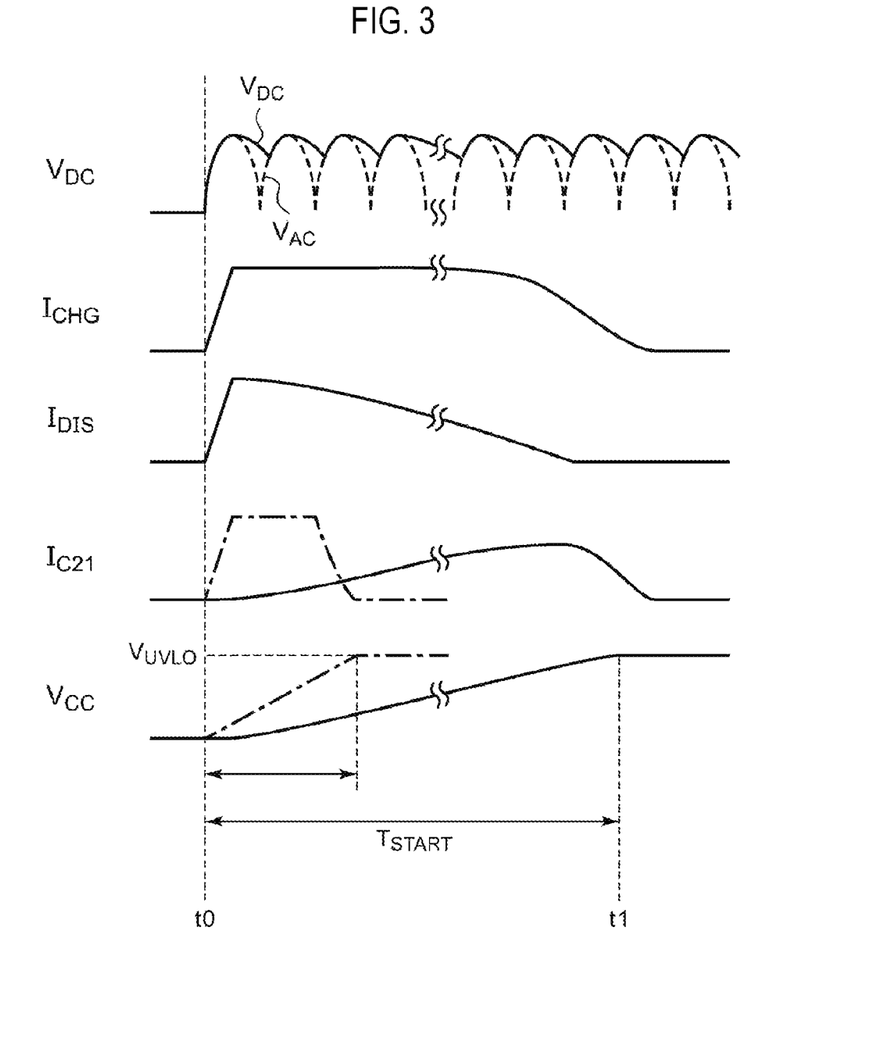
FIG. 3 is an operational waveform view when the switching converter of FIG. 1 is started up.

The configuration of the switching converter 100 has been described above. Next, an operation thereof will be described. FIG. 3 is an operational waveform view when the switching converter 100 of FIG. 1 is started up. The vertical axis and horizontal axis of the waveform views or time charts herein are appropriately scaled up and down to facilitate understanding, and also, respective waveforms illustrated are simplified, exaggerated, or emphasized to facilitate understanding.

At time t0, when the switch of the lighting device 500 is turned on, an AC voltage $V_{AC}$ is supplied to the LED light source 502. A DC input voltage $V_{DC}$ is generated on the input line 104 of the switching converter 100.

The charge current $I_{CHG}$ flows from the input line 104 to the first capacitor C21 through the start-up circuit 202. Meanwhile, the discharge current $I_{DIS}$ flows out from the first capacitor C21 through the discharge circuit 110. The first capacitor C21 is charged by a current $I_{C21}$ corresponding to a difference between the charge current $I_{CHG}$ and the discharge current $I_{DIS}$. When the first capacitor C21 is started to be charged, the power source voltage $V_{CC}$ is increased. Thereafter, at time t1, when the power source voltage $V_{CC}$ reaches an operable threshold voltage (lowermost operating voltage) of the control circuit 200, the control circuit 200 starts to switch the switching transistor M1 to light the LED light source 502. In other words, a start-up time $T_{START}$ of the switching converter 100 corresponds to a period of times t0 to t1. The operation of the switching converter 100 according to the embodiment has been described above.

For comparison, the operation of the switching converter 100r of FIG. 1 is illustrated by the alternate long and short dash line in FIG. 3. In the switching converter 100r of FIG. 1, the discharge circuit 110 is not installed, and thus, the discharge current $I_{DIS}$ is zero and $I_{C21}=I_{CHG}$. Thus, the first capacitor C21 is charged with a large current after start-up, and the power source voltage $V_{CC}$ is increased within a short time and a start up time $T_{START}'$ is shortened.

According to this switching converter 100, since the discharge circuit 110 is installed, the start-up time $T_{START}$ can be lengthened, when compared with the related art. Further, it is possible to set the start-up time $T_{START}$ according to an amount of current of the discharge current $I_{DIS}$ generated by the discharge circuit 110.

Setting the start-up time $T_{START}$ refers to setting a lighting time of the LED light source 502. A related-art fluorescent lamp or an incandescent lamp is lighted after a start-up time elapses which is relatively long from a time at which a switch is turned on to a time at which the fluorescent lamp or the incandescent lamp is lighted. According to the switching converter 100 of the embodiment, it is possible to realize a lighting time comparable to that of the fluorescent lamp or the incandescent lamp.

The present disclosure is recognized through the block diagram and circuit diagram of FIG. 2, and encompasses various devices and circuits derived from the above description and is not limited to a specific configuration. Hereinafter, a more specific configuration example will be described in order to help and clarify understanding of the essence and circuitry operation of the present disclosure, rather than to narrow the scope of the present disclosure.

Figure 4:
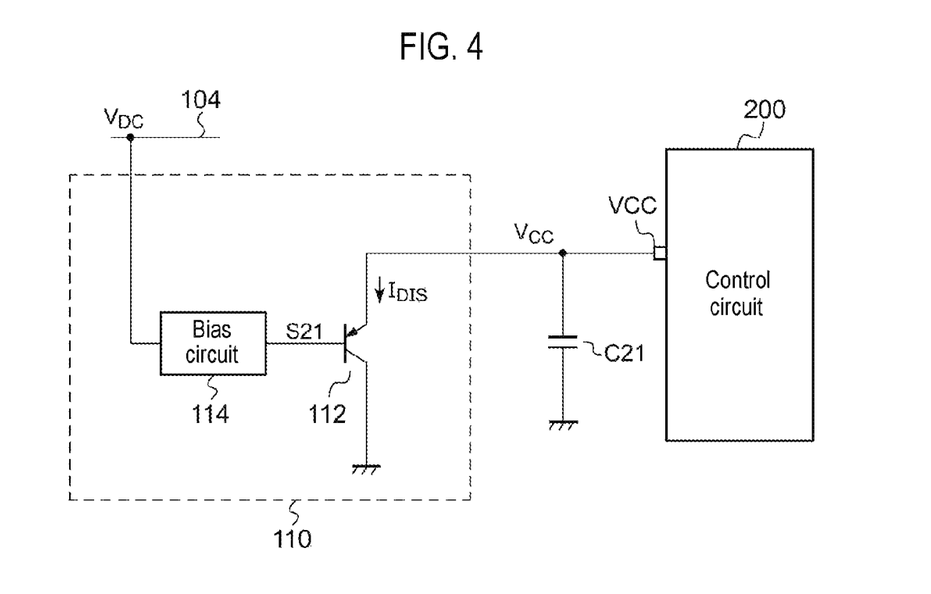
FIG. 4 is a circuit diagram illustrating a configuration example of a discharge circuit.

FIG. 4 is a circuit diagram illustrating a configuration example of the discharge circuit 110. The discharge circuit 110 includes a discharge transistor 112 and a bias circuit 114. The discharge transistor 112 is installed in parallel to the first capacitor C21.

The bias circuit 114 supplies a bias signal S21 to a control terminal (base or gate) of the discharge transistor 112. When the input voltage $V_{DC}$ of the input line 104 is increased, that is, when the start-up of the switching converter 100 is instructed, the bias circuit 114 starts to generate the bias signal S21.

The discharge transistor 112 may be configured as, for example, a PNP-type bipolar transistor or a P-channel MOSFET. When the input voltage $V_{DC}$ is increased, the bias circuit 114 increases the bias signal S21 toward a predetermined voltage level over time. Thus, the discharge current $I_{DIS}$ flowing through the discharge transistor 112 is increased to its peak immediately after the start-up, and subsequently decreased over time.

Figure 5:
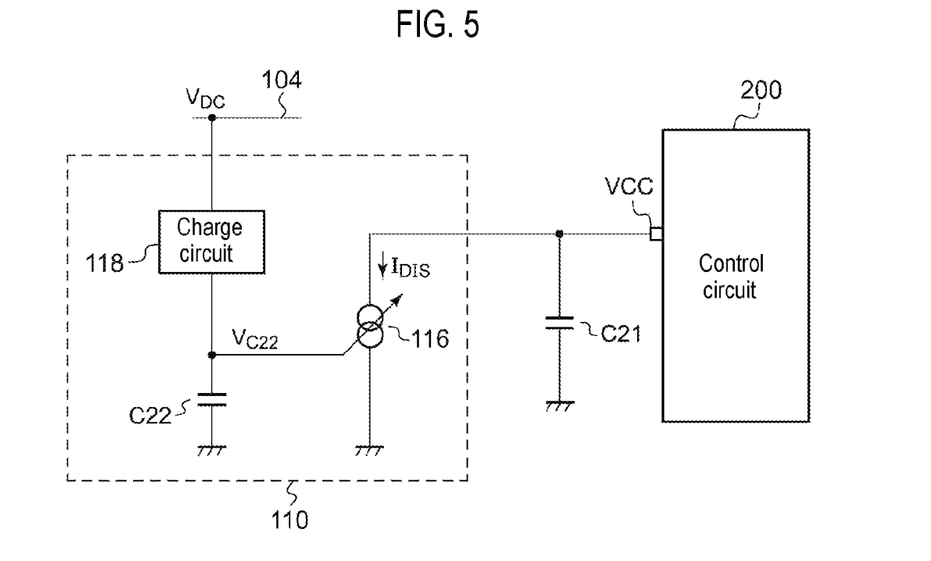
FIG. 5 is a circuit diagram illustrating a configuration example of a discharge circuit.

FIG. 5 is a circuit diagram illustrating a configuration example of the discharge circuit 110. The discharge circuit 110 includes a second capacitor C22, a variable current source 116, and a charge circuit 118. When the input voltage $V_{DC}$ is supplied, the charge circuit 118 charges the second capacitor C22 to a predetermined voltage level. In other words, the second capacitor C22 is charged according to the input voltage $V_{DC}$.

Upon receipt of a voltage $V_{C22}$ generated in the second capacitor C22, the variable current source 116 generates a discharge current $I_{DIS}$ corresponding to the voltage $V_{C22}$. The variable current source 116 may be recognized as a V/I conversion circuit. The discharge current $I_{DIS}$ is decreased as the voltage $V_{C22}$ of the second capacitor C22 is increased.

The discharge circuit 110 of FIG. 4 and the discharge circuit 110 of FIG. 5 may be understood to be the same circuit but recognized in different aspects. For example, the discharge transistor 112 of FIG. 4 may correspond to the variable current source 116 of FIG. 5, the bias signal S21 of FIG. 4 may correspond to the voltage $V_{C22}$ of FIG. 5, and the bias circuit 114 of FIG. 4 may correspond to the charge circuit 118 and the second capacitor C22 of FIG. 5.

Figure 6:
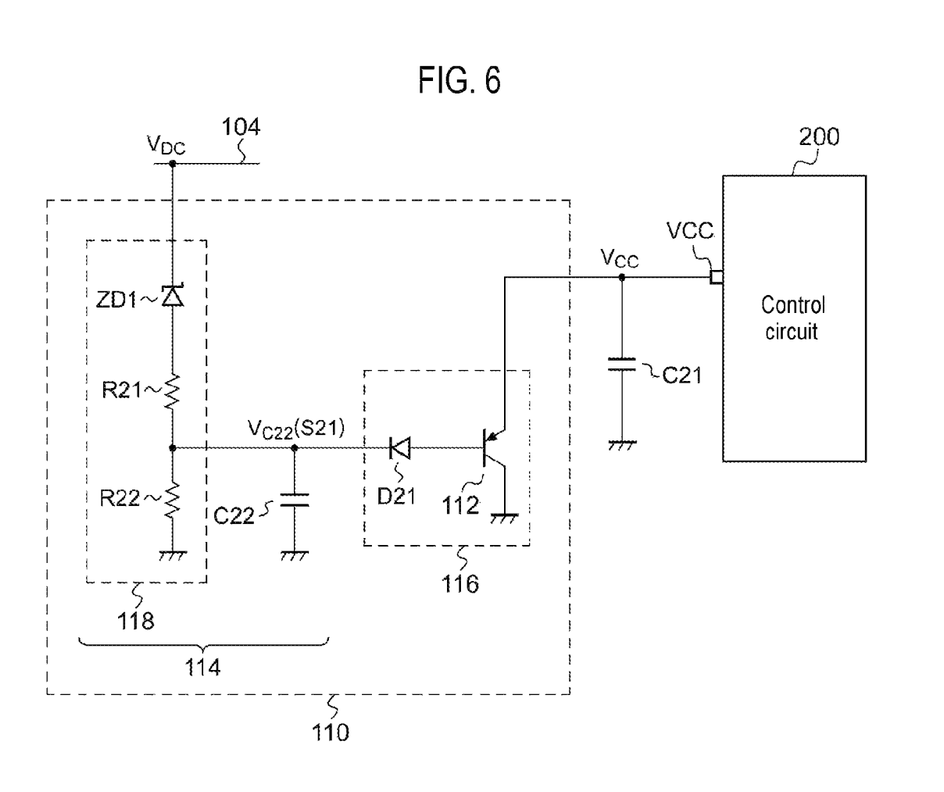
FIG. 6 is a circuit diagram illustrating a specific configuration example of the discharge circuit.

FIG. 6 is a circuit diagram illustrating a specific configuration example of the discharge circuit 110. The charge circuit 118 includes a first resistor R21, a second resistor R22, and a Zener diode ZD1. The first resistor R21 is installed between the input line 104 and the second capacitor C22. The second resistor R22 is installed in parallel to the second capacitor C22. The Zener diode ZD1 is installed in series to the first resistor R21 between the second capacitor C22 and the input line 104.

When an input voltage $V_{DC}$ is supplied to the charge circuit 118, the second capacitor C22 is charged such that a voltage $V_{C22}$ across the second capacitor C22 becomes close to $(V_{DC}-V_Z) \times R\ 22/(R21+R22)$. Thereafter, a bias signal S21 that is based on the voltage $V_{C22}$ of the second capacitor C22 is supplied to a control terminal (base) of the discharge transistor 112. The variable current source 116 may include a diode D21 connected to the base of the discharge transistor 112.

With this configuration, the voltage $V_{C22}$ is varied according to a CR time constant corresponding to the second capacitor C22 and the first resistor R21. In other words, it is possible to set a start-up time according to a capacitance value and a resistance value.

It is to be understood by those skilled in the art that the embodiments are merely illustrative and may be variously modified by any combination of the components or processes, and the modifications are also within the scope of the present disclosure. Hereinafter, these modifications will be described.

(First Modification)

Figure 7:
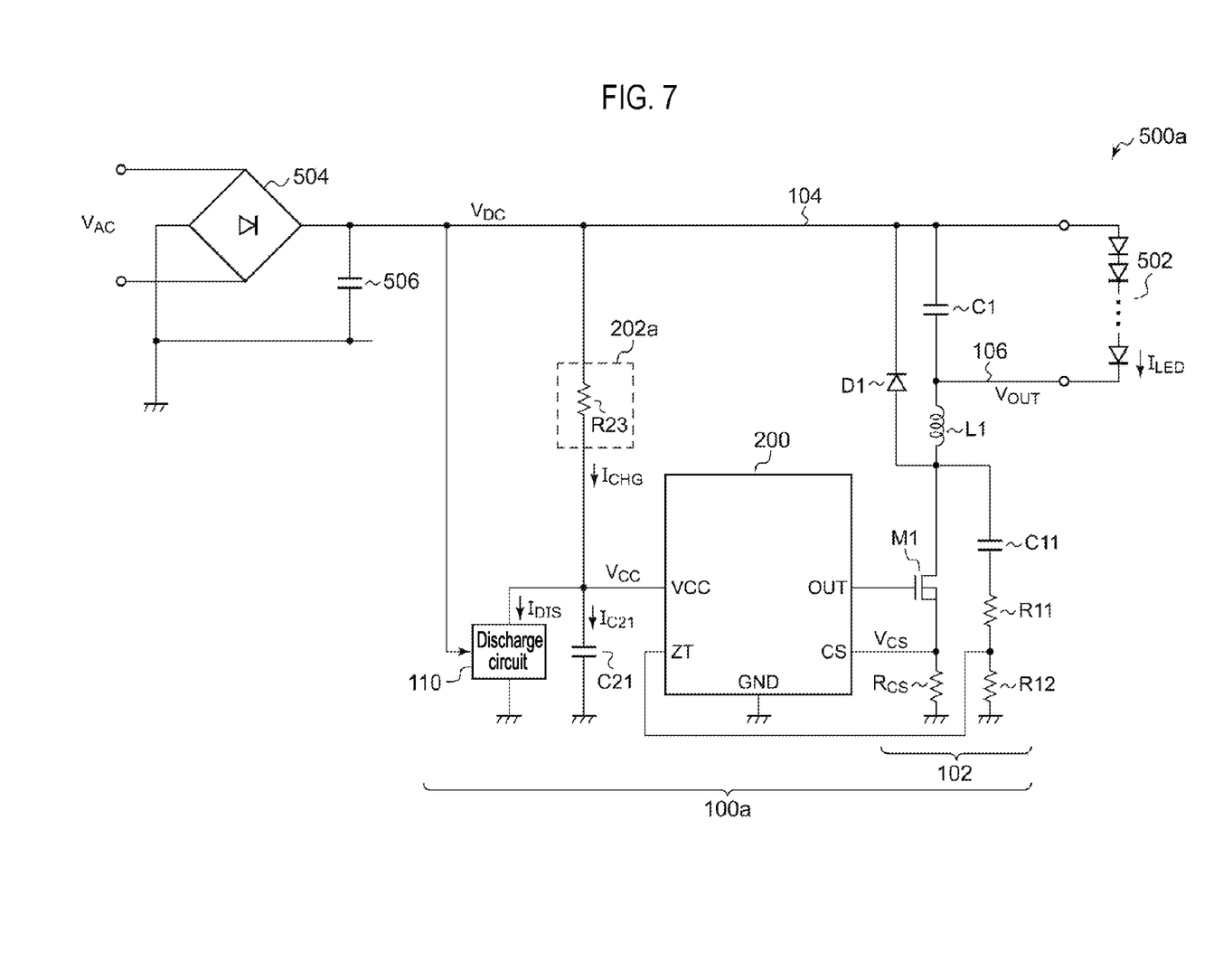
FIG. 7 is a circuit diagram of a switching converter according to a first modification of the present disclosure.

FIG. 7 is a circuit diagram of a switching converter 100a according to a first modification. A start-up circuit 202a includes a third resistor R23 externally attached to the control circuit 200. The third resistor R23 is installed between the input line 104 and the first capacitor C21. The start-up circuit 202a includes a Zener diode (not shown) connected in series to the third resistor R23.

According to this modification, it is possible to set the charge current $I_{CHG}$ according to a resistant value of the third resistor R23, and further set a start-up time.

(Second Modification)

In the switching converter 100 of FIG. 2, an auxiliary winding coupled to the inductor L1 may be installed, instead of the capacitor C11 and the resistors R11 and R12, to input a $V_{ZT}$ corresponding to a voltage generated at the auxiliary winding to the ZT terminal of the control circuit 200. Further, with this configuration, it is possible to realize a pseudo-resonance mode.

(Third Modification)

The control scheme of the switching converter 100 is not limited to the pseudo-resonance scheme, and a hysteresis control (Bang-Bang control), a PWM control (or PFM control) of a voltage mode, a PWM control (or PFM control) of a current mode, or the like may be employed.

(Fourth Modification)

Figure 8:
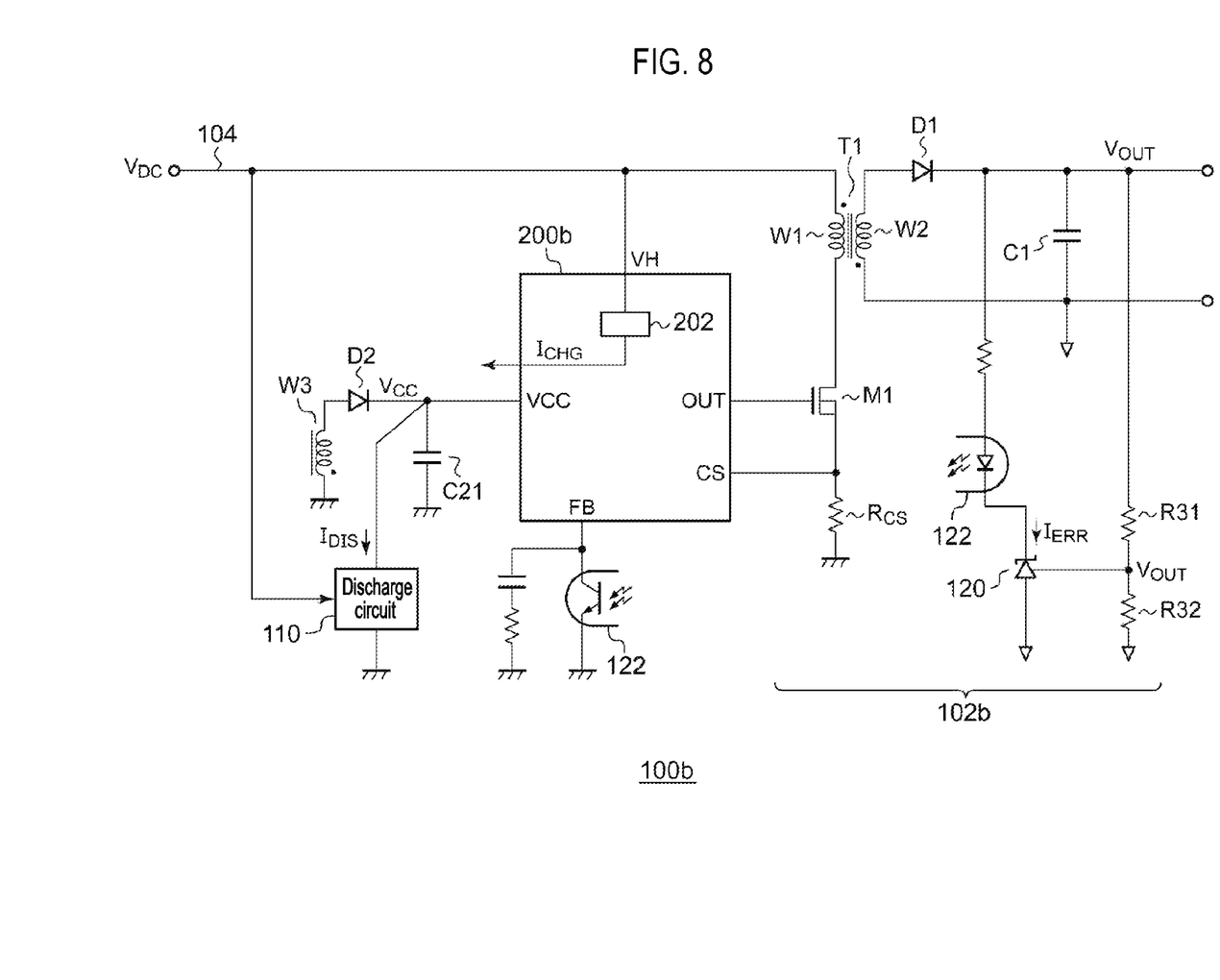
FIG. 8 is a circuit diagram of a switching converter according to a fourth modification of the present disclosure.

The topology of the switching converter 100 and the type of the load are not limited to those of FIG. 2. FIG. 8 is a circuit diagram of a switching converter 100b according to a fourth modification. In the switching converter 100b, an output circuit 102b has a flyback type topology and includes a transformer T1, a diode D1, a smoothing capacitor C1, resistors R31 and R32, a shunt regulator 120, and a photocoupler 122.

The control circuit 200b is a controller of a flyback converter, and a commercial product may be used. An output voltage $V_{OUT\_S}$ divided by the resistors R31 and R32 is input to an REF terminal of the shunt regulator 120. The shunt regulator 120 generates a current $I_{ERR}$ corresponding to an error between the voltage $V_{OUT\_S}$ and the reference voltage $V_{REF}$, and drives a light emitting device of the photocoupler 122. A feedback current $I_{FB}$ corresponding to the output voltage $V_{OUT\_S}$ flows to a light receiving device of the photocoupler 122. A feedback voltage $V_{FB}$ corresponding to the feedback current $I_{FB}$ is generated at the FB terminal. The control circuit 200b drives the switching transistor M1 with a duty ratio corresponding to the feedback voltage $V_{FB}$.

The control circuit 200b includes a VH terminal, a VCC terminal, and a start-up circuit 202. When started up, the discharge circuit 110 discharges the first capacitor C21. Further, a diode D2 and an auxiliary winding W3 of the transformer T1 are connected to the first capacitor C21.

When the switching converter 100b is started up, the first capacitor C21 is charged through the start-up circuit 202 and the first capacitor C21 is discharged by the discharge circuit 110. Further, a voltage $V_{CC}$ of the first capacitor C21 is gently increased, and thus, the control circuit 200b can be operated after the lapse of a start-up time $T_{START}$.

When the control circuit 200b is operable and the switching transistor M1 is started to be switched, the voltage $V_{CC}$ of the first capacitor C21 is stabilized to a predetermined voltage in proportion to the output voltage $V_{OUT}$ by a converter including the auxiliary winding W3 and the diode D2.

Further, in this flyback converter, it is possible to set an appropriate start-up time in every application by adding the discharge circuit 110. The switching converter 100b of FIG. 8 may be appropriately used in an AC/DC converter, an AC adapter, or the like.

(Fifth Modification)

The switching converter 100 may be a buck converter or a boost converter, and the topology of the output circuit 102 may be determined according to the type of the converter. Further, a synchronous rectification type, rather than a diode rectification type, may be used.

(Sixth Modification)

In the embodiment, the case in which the LED light source 502 is an LED string has been described, but the type of the load is not particularly limited Further, a combination of the foregoing embodiment and any of the modifications is effective as an aspect of the present disclosure.

Figure 9A:
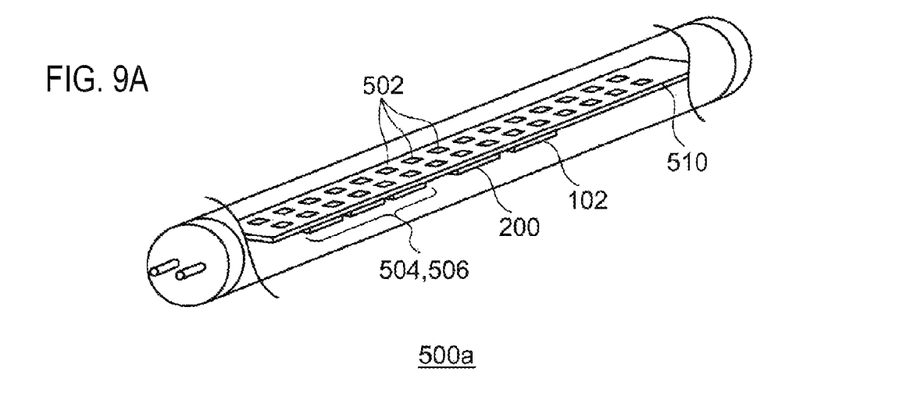
FIGS. 9A to 9C are views illustrating specific examples of the lighting device.
Figure 9B:
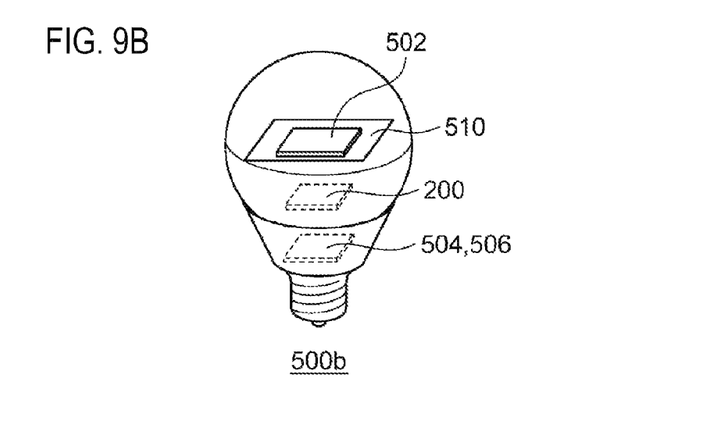
Figure 9C:
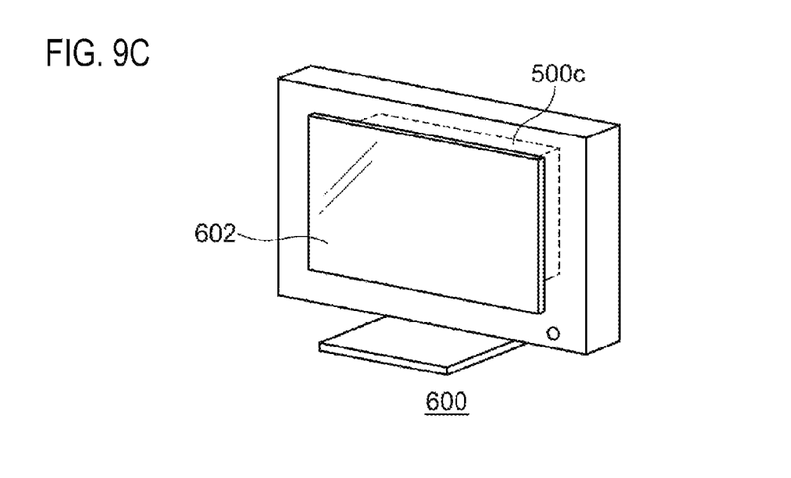

FIGS. 9A to 9C are views illustrating specific examples of the lighting device 500. In FIGS. 9A to 9C, all the components are not shown and some of them are omitted. A lighting device 500a of FIG. 9A is a tubular LED lighting. A plurality of LED devices constituting an LED string as the LED light source 502 are laid out on a board 510. A rectifying circuit 504, a control circuit 200, an output circuit 102, and the like are mounted on the board 510.

A lighting device 500b of FIG. 9B is a bulb-type LED lighting. An LED module as the LED light source 502 is mounted on a board 510. A control circuit 200 and a rectifying circuit 504 are mounted within the housing of the lighting device 500b.

A lighting device 500c of FIG. 9C is a backlight incorporated in a liquid crystal display (LCD) 600. The lighting device 500c irradiates the rear of a liquid crystal panel 602.

Alternatively, the lighting device 500 may be used for ceiling lights. In this manner, the lighting device 500 may be used for various applications.

According to the present disclosure in some embodiments, it is possible to set a start-up time.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A switching converter for supplying power to a load, comprising:
   an output circuit comprising a switching transistor, an inductive element, and a rectifying element configured to rectify a current flowing to the inductive element according to switching of the switching transistor;
   a control circuit configured to drive the switching transistor;
   a first capacitor configured to generate a power source voltage for the control circuit between both ends of the first capacitor;
   a start-up circuit installed between an input line to the switching converter and the first capacitor, and configured to charge the first capacitor with an input voltage of the input line; and
   a discharge circuit configured to discharge the first capacitor when the switching converter is started up,
   wherein the discharge circuit comprises a second capacitor charged according to the input voltage, and a discharge current flowing through the discharge circuit decreases as a voltage of the second capacitor increases.

2. The switching converter of claim 1, wherein the discharge current flowing through the discharge circuit is increased after the switching converter is started up, and subsequently decreased over time.

3. The switching converter of claim 1, wherein the control circuit comprises:
   a power source terminal to which the first capacitor is connected; and
   a high voltage terminal configured to receive the input voltage from the input line, and
   wherein the control circuit includes the start-up circuit incorporated between the power source terminal and the high voltage terminal.

4. The switching converter of claim 1, wherein the start-up circuit comprises a third resistor installed outside the control circuit, between the input line and the first capacitor.

5. The switching converter of claim 1, wherein the load is a semiconductor light source.

6. The switching converter of claim 1, wherein the output circuit comprises:
   an output capacitor installed between an output line to which one end of the load is connected and the input line;
   a diode having a cathode connected to the input line;
   an inductor installed between the output line and an anode of the diode; and
   the switching transistor installed between the anode of the diode and a ground.

7. The switching converter of claim 1, wherein the output circuit has a flyback-type topology.

8. The switching converter of claim 1, wherein the output circuit has a topology of a buck converter or a boost converter.

9. A lighting device, comprising:
   a semiconductor light source; and
   the switching converter of claim 1, configured to light the semiconductor light source.

10. The lighting device of claim 9, further comprising:
    a rectifying circuit configured to rectify an AC voltage; and a smoothing capacitor configured to smooth an output voltage of the rectifying circuit to supply the same to an input line of the switching converter.

11. A switching converter for supplying power to a load, comprising:
an output circuit comprising a switching transistor, an inductive element, and a rectifying element configured to rectify a current flowing to the inductive element according to switching of the switching transistor;
a control circuit configured to drive the switching transistor;
a first capacitor configured to generate a power source voltage for the control circuit between both ends of the first capacitor;
a start-up circuit installed between an input line to the switching converter and the first capacitor, and configured to charge the first capacitor with an input voltage of the input line; and
a discharge circuit configured to discharge the first capacitor when the switching converter is started up,
wherein the discharge circuit comprises:
a discharge transistor installed in parallel to the first capacitor; and
a bias circuit configured to supply a bias signal that is based on the input voltage to a control terminal of the discharge transistor.

12. The switching converter of claim 11, wherein the bias circuit comprises:
a second capacitor; and
a first resistor installed between the input line and the second capacitor, and
wherein the bias signal that is based on a voltage of the second capacitor is supplied to the control terminal of the discharge transistor.

13. The switching converter of claim 12, wherein the bias circuit further comprises a second resistor installed in parallel to the second capacitor.

14. The switching converter of claim 12, wherein the bias circuit further comprises a Zener diode installed in series to the first resistor between the second capacitor and the input line.

15. The switching converter of claim 11, wherein the discharge transistor is a PNP-type bipolar transistor or a P-channel MOSFET.

16. A lighting device, comprising:
a rectifying circuit configured to rectify an AC voltage;
a smoothing capacitor configured to smooth an output voltage of the rectifying circuit;
a semiconductor light source; and
a switching converter configured to receive a DC input voltage from the smoothing capacitor to light the semiconductor light source,
wherein the switching converter comprises:
an output circuit comprising a switching transistor, an inductive element, and a rectifying element configured to rectify a current flowing to the inductive element according to switching of the switching transistor;
a control circuit configured to drive the switching transistor;
a first capacitor configured to generate a power source voltage for the control circuit between both ends of the first capacitor;
a start-up circuit installed between an input line to the switching converter and the first capacitor and configured to charge the first capacitor with an input voltage of the input line;
a discharge transistor installed in parallel to the first capacitor;
a second capacitor; and
a first resistor installed between the input line and the second capacitor, and
wherein a bias signal that is based on a voltage of the second capacitor is supplied to a control terminal of the discharge transistor.

* * * * *